United States Patent
Cudden

[11] Patent Number: 5,301,997
[45] Date of Patent: Apr. 12, 1994

[54] MODULAR PASSENGER COMPARTMENT FOR MOTOR VEHICLE

[76] Inventor: Charles Cudden, 24395 Power, Farmington Hills, Mich. 48336

[21] Appl. No.: 20,263

[22] Filed: Feb. 18, 1993

Related U.S. Application Data

[63] Continuation of Ser. No. 818,621, Jan. 10, 1992, abandoned.

[51] Int. Cl.⁵ .................................................. B62D 27/00
[52] U.S. Cl. ....................................... 296/183; 296/197; 29/401.1
[58] Field of Search ................. 818/621; 296/164, 166, 296/183, 35.3, 196, 197, 39.1, 210, 183; 29/401.1

[56] References Cited

U.S. PATENT DOCUMENTS

| | | | |
|---|---|---|---|
| 1,855,747 | 4/1932 | Ledwinka | 296/210 |
| 2,072,842 | 3/1937 | Trautvetter | 296/210 |
| 2,559,029 | 1/1950 | Randolph | 296/35.3 |
| 3,297,355 | 1/1967 | Robinson | 296/166 |
| 3,390,913 | 7/1968 | Hunter | 296/164 X |
| 3,399,448 | 9/1968 | Jackson | 296/210 X |
| 3,703,310 | 11/1972 | Lystad | 296/10 |
| 3,843,189 | 10/1974 | Duff et al. | 296/166 X |
| 4,458,939 | 7/1984 | Hohn | 296/164 |
| 4,489,977 | 12/1984 | Earing, Jr. | 296/35.3 |
| 4,842,326 | 6/1989 | Divito | 296/196 |
| 4,848,832 | 7/1989 | Starnes | 296/166 |
| 4,887,859 | 12/1989 | Aper | 296/196 X |
| 5,004,293 | 4/1991 | Thomas | 296/166 |

FOREIGN PATENT DOCUMENTS

| | | | |
|---|---|---|---|
| 304522 | 1/1933 | Italy | 296/210 |
| 0121144 | 6/1985 | Japan | 296/39.1 |

*Primary Examiner*—Dennis H. Pedder
*Attorney, Agent, or Firm*—Harness, Dickey & Pierce

[57] ABSTRACT

A utility vehicle such as a pick-up truck is modified by having a modular compartment mounted to the chassis so as to allow passengers to freely move between the cab and the modular compartment.

3 Claims, 3 Drawing Sheets

MODULAR PASSENGER COMPARTMENT FOR MOTOR VEHICLE

This is a continuation of U.S. patent application Ser. No. 07/818,621, filed Jan. 10, 1992, now abandoned.

BACKGROUND AND BRIEF DESCRIPTION OF THE INVENTION

Sport utility vehicles have become increasingly popular among vehicle buyers. Sport utility vehicles are often based upon a light-duty truck chassis and, instead of a cab and rear cargo box or cargo area, have an integrated passenger compartment which extends rearward from the cab over substantially the entire length of the vehicle. Thus, the interior may be similar to a van or a station wagon. However, differences in the chassis and/or drive train components make for a vehicle with handling and performance characteristics that differ from those other vehicles.

Unfortunately, sport utility vehicles are relatively expensive compared to the other utility vehicles, such as pick-up trucks, upon which they are based. Furthermore, the options available for the interior layout of the rear portion of the sport utility vehicle (i.e., for carrying passengers, cargo, equipment, etc.) are limited to relatively few alternatives offered by the vehicle manufacturers. In addition, certain equipment options (such as drive train, suspension, etc.) may only be offered on the truck version of the vehicle but not on the sport utility version. Alternatively, the desired equipment options may have to be purchased in combination with other options the customer does not want. In short, the economies of scales generally preclude the vehicle manufacturers from offering a wider variety of optional layouts for the rear passenger compartment due to the smaller volumes typically associated with more customized layouts. In addition, the passenger compartments associated with most modern sport utility vehicles cannot easily be transferred to the chassis of an existing pick-up truck should the owner of the pick-up truck wish to convert his vehicle to a sport utility version.

Camper top additions to pick-up trucks are quite popular since they offer the pick-up truck owner an opportunity to obtain some, but by no means all, of the advantages of the sport utility vehicle. The camper top is most often a rigid shell that is attached to the existing cargo box for defining an enclosed compartment over the cargo box. In essence, the pick-up truck is converted into two compartments, namely, the cab and an enclosed rear compartment. Passengers and cargo are not readily transferrable between the cab and rear compartment due to the rear wall of the cab and/or front of the cargo box and camper top. Since the camper top merely encloses the rear cargo box, alternate provisions must be made to install any seating equipment or other amenities typically found in a sport utility vehicle. The revisions and alterations necessary to install such seating and other equipment oftentimes result in substantial effort and expense as well as extensive modifications to the cargo area.

Accordingly, it is an object of the present invention to provide a modular vehicle compartment constructed such that a vehicle, such as a pick-up truck, can be easily and quickly modified into a sport utility vehicle. It is another object of the present invention to provide a method by which a vehicle, such as a pick-up truck, can be quickly and easily modified so as to be remanufactured into a sport utility vehicle. It is another object of the present invention to provide a method of converting a pick-up truck into a sport utility vehicle which can provide a single integrated passenger compartment. It is still another object of the present invention to provide a sport utility vehicle which is easier and more cost effective to manufacture in low production volumes, especially for more customized versions.

In general, the present invention relates to a modular passenger compartment which can be retro-fitted to a vehicle such as a pick-up truck. The pick-up truck is prepared by removing the existing cargo box, if one was installed at the factory. An enlarged aperture is provided by removing a portion of the rear wall of the cab. A modular compartment is then secured to the chassis. The modular compartment has a front wall apertured to match the aperture cut into the rear wall of the cab. By aligning the two apertures, a single interior compartment is created that extends rearwardly from the driver's location to substantially the end of the vehicle. A sealing arrangement can be disposed about the apertures between the rear of the cab and the front of the modular compartment for insulating the interior compartment from wind, noise, particulates, etc., found in the outside ambient environment.

The interior of the modular passenger compartment can be configured with a layout to suit the customer needs. For example, additional seating in the form of bench or bucket seats can be provided with or without a portion of the floor area configured to receive cargo. Likewise, specialized layouts can be manufactured such as camping layouts which may include a bed or food preparation area in addition to or in lieu of seating capacity. Because of the relative ease in which an existing vehicle platform can be converted, alternative modular compartments may be constructed for other specialized situations, such as for example, a paramedic/ambulance.

Unlike conventional truck conversions, passengers and cargo can be transferred between the driver's portion of the vehicle and the rear compartment. In addition, certain systems of the vehicle (i.e., HVAC, electrical, and sound systems, etc.), can be easily extended or modified to service the entire interior of the vehicle.

From the subsequent detailed description taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
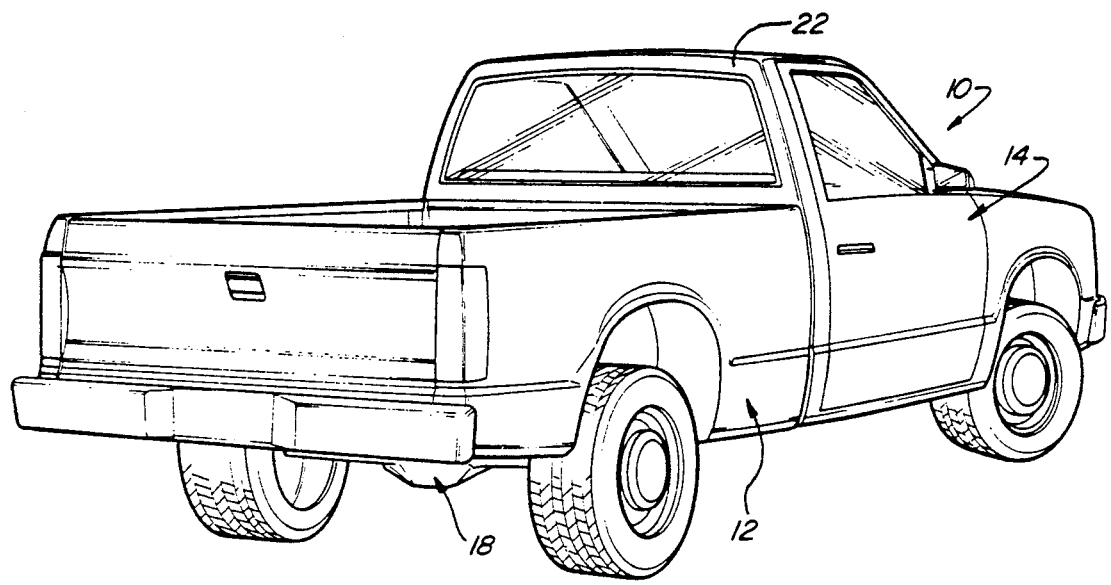
FIG. 1 is a perspective view of a standard pick-up truck.

Referring to the drawings wherein is illustrated a preferred example of the invention. FIG. 1 illustrates a pick-up truck 10 of the conventional type provided with a factory installed cargo box 12 mounted behind a cab portion 14 of truck 10. Alternately, light and medium duty trucks such as pick-ups can be secured from the factory without a cargo box installed. A pick-up truck provides a readily available and inexpensive basis on which to practice the present invention. However, any light to medium-duty truck or utility vehicle having a chassis capable of supporting the unitized module can be used.

Figure 2:
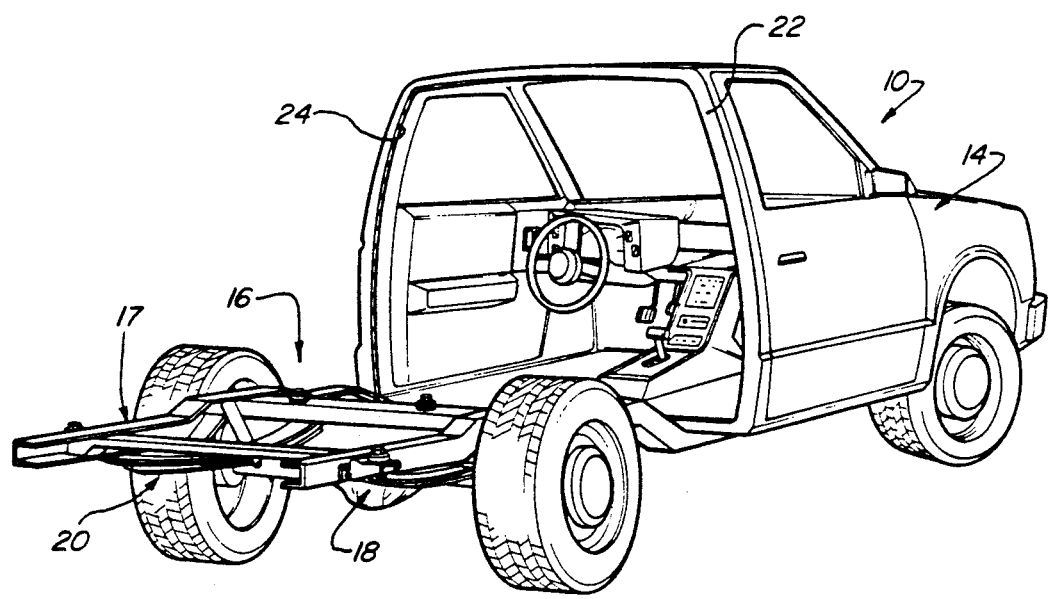
FIG. 2 is a perspective view of the pick-up truck undergoing modification for a conversion according to a preferred method of the present invention.

Referring to FIG. 2, pick-up truck 10 has started to undergo modification for the present invention, having had cargo box 12 removed down to chassis 16. Typical construction for chassis 16 will be an open channel or tubular rail construction forming a rigid frame assembly 17. The vehicle drivetrain 18 and suspension components 20 remain secured to chassis 16. A rear wall 22 of cab 14 has been modified to include an enlarged aperture, as illustrated by aperture periphery 24. In a preferred embodiment, aperture periphery 24 is located approximately 3 inches inward from the outer periphery of cab rear wall 22. Typically, aperture periphery 24 would be located approximately adjacent to the innermost end of a factory-installed reinforcement member 26 (shown in FIG. 5) that is secured to a portion of rear wall 22 within cab 14. In another embodiment, aperture periphery 24 may define an opening only behind the passenger area of the front seat, leaving the cab rear wall intact behind the driver.

Figure 3:
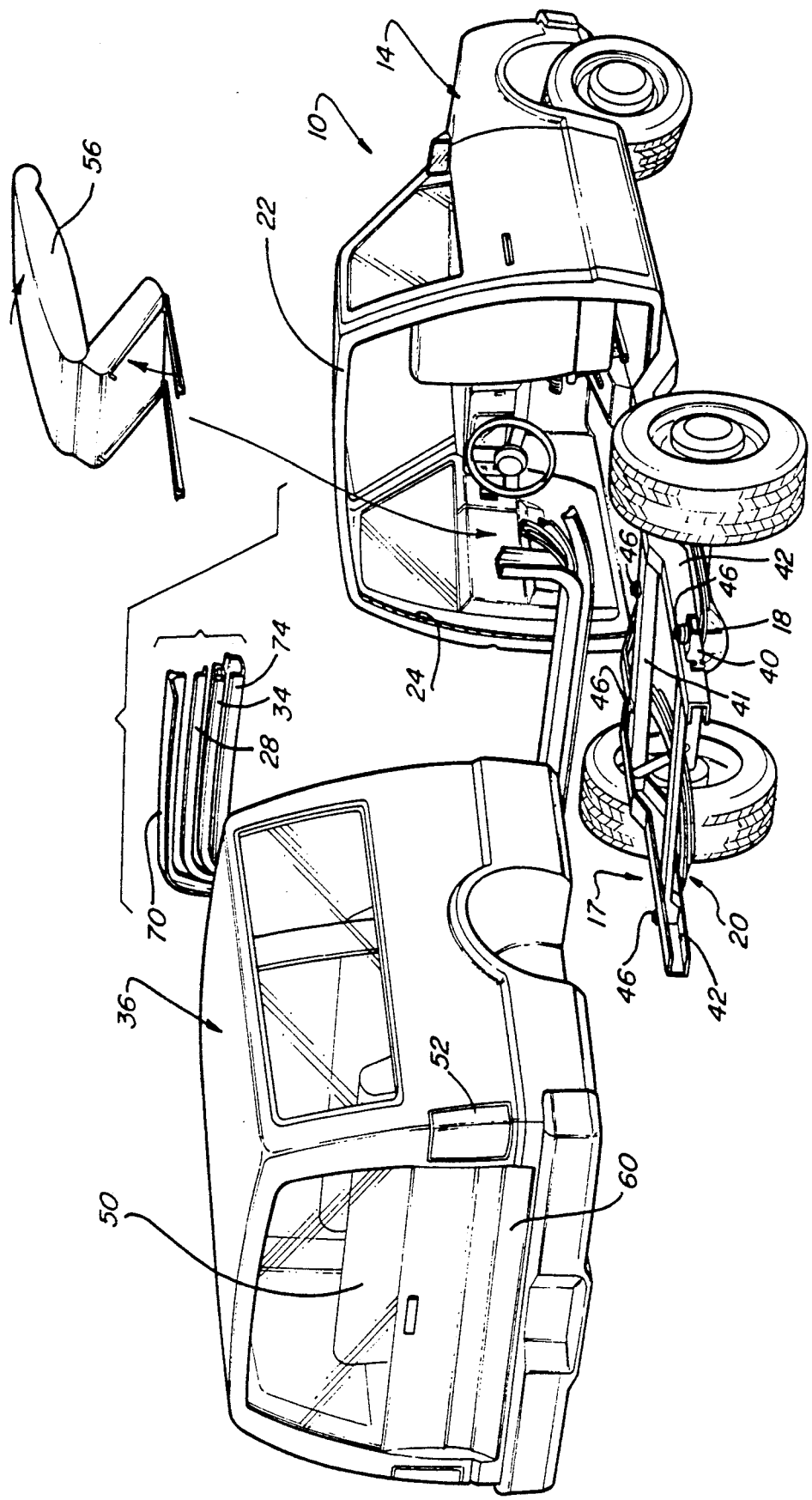
FIG. 3 is an exploded perspective view of the present invention.
Figure 4:
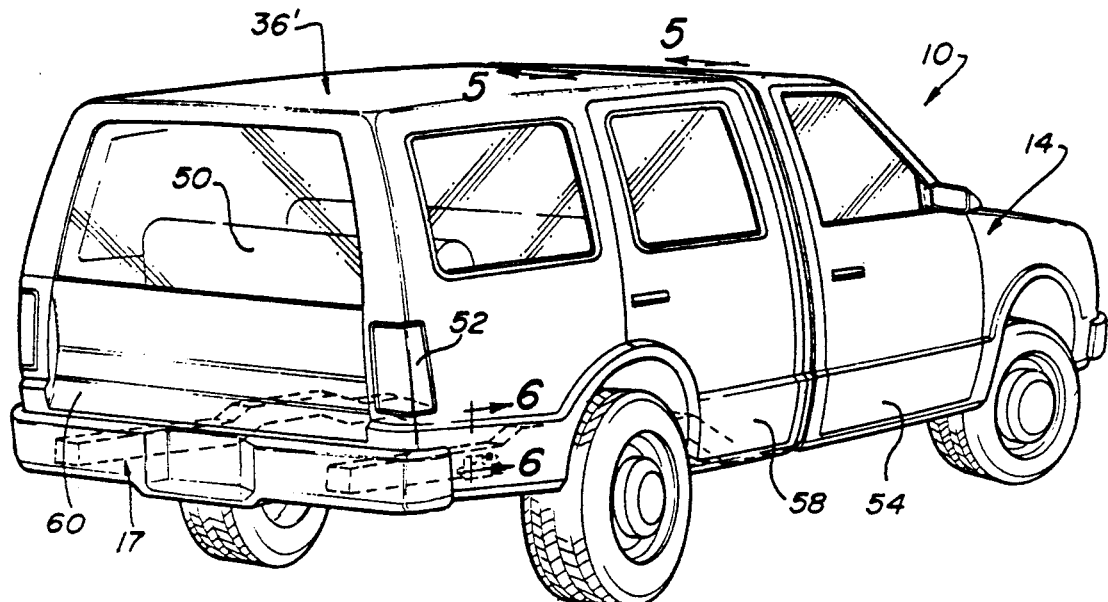
FIG. 4 is a perspective view of the present invention.
Figure 5:
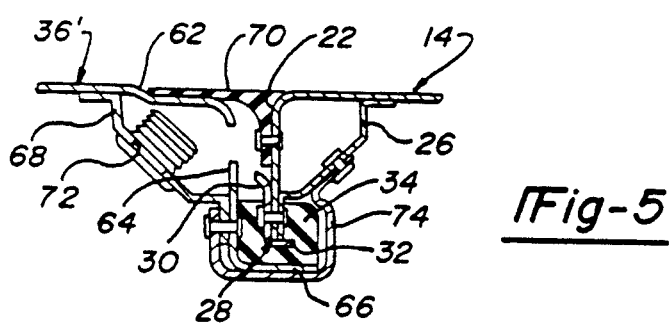
FIG. 5 is a cross-sectional view taken through line 5—5 of FIG. 4.

With reference now to FIGS. 3 through 5, further modifications to the vehicle according to the present invention are illustrated. An aperture reinforcement member or "stiffener" 28 is secured to rear wall 22 of cab 14 to assist in maintaining the structural integrity of cab 14. The size and stiffness of stiffener 28 will vary based on application and particularly the size of aperture 24 in the cab rear wall and the amount of structural rigidity lost when creating the aperture. Stiffener 28 may be constructed as a unitized member or as individual segmented components that are bolted, welded or otherwise secured to the exterior or the interior surface of cab rear wall 22. According to a preferred construction, stiffener 28 has a first surface 30 adapted for direct attachment to rear wall 22 and a second transversely extending surface 32 provided for surrounding aperture periphery 24.

As best seen in FIG. 5, a resilient sealing member 34 is disposed against stiffener 28 for insulating the interior of the vehicle from the ambient environment at the intersection between cab 14 and a modular compartment 36. Preferably, sealing member 34 is fabricated from a resilient material which is capable of insulating the interior from ambient noise, heat, particulates, etc. In addition, the resilient nature of sealing member 34 helps in maintaining the insulation of the interior during any slight torsional movement that may occur between cab 14 and modular compartment 36. Accordingly, modular compartment 36 is isolated from transitory torsional movements relative to cab 14 about the longitudinal axis of the vehicle. In addition to its sealing function, sealing member 34 can also perform a cosmetic function by obscuring the gap between cab 14 and modular compartment 36. Moreover, the surface of sealing member 34 can be structured and styled to provide a smooth interior transition surface between cab 14 and modular compartment 36.

Figure 6:
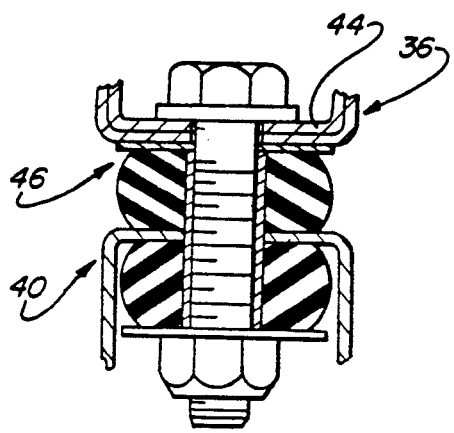
FIG. 6 is a partial cross-sectional view taken through line 6—6 of FIG. 4.

To facilitate relatively simple assembly, modular compartment 36 is secured to chassis 16 using the original equipment mounting system that had been provided for mounting cargo box 12 to a plurality of frame brackets 40 and/or cross rails 41. Since modular compartment 36 is structurally self-supporting, the use of frame brackets 40 is advantageous in that it preserves the original design loading parameters associated with frame rails 42 of chassis 16 so as to eliminate the need for costly and time consuming recertification testings. Turning to FIG. 6, it can be seen that a floor surface 44 of modular passenger compartment 36 is secured to frame brackets 40 of chassis 16 in a conventional manner (i.e., via an isolation grommet assembly 46). The entire floor surface 44 of modular compartment 36 can be designed for adaption to any particular chassis upon which it is to be mounted such that uncomplicated assembly can be realized while maximizing utilization of available interior space. As such, available space in chassis 16 between frame rails 42 can be utilized by downwardly extending the floor of modular compartment 36 to provide for additional foot room and/or cargo storage. Also, the floor of modular compartment 36 can be modified to store a spare tire. As will be appreciated, modular compartment 36 is assembled onto chassis 16 using at least three, and preferably four, mounting points (i.e., at each frame bracket 40) for securely mounting modular compartment 36 to the pre-existing mounting system associated with the chassis 16 for minimizing torsional movement therebetween.

Returning to FIG. 3, the interior layout of structurally self-supporting modular compartment 36 can be configured with any number of ergonomic and aesthetically pleasing seating arrangements 50 or other equipment. Certain specialized applications, (e.g., an ambulance) may not have any seating per se but, for example, provisions for the storage and use of medical equipment and interior room for a patient.

Modular compartment 36 is substantially self-enclosed except for an aperture formed in its forward section that is provided for alignment and communication with aperture periphery 24 formed in rear wall 22 of cab 14. In this manner, a single "passenger continuous" interior space is created within the vehicle which allows a passenger to move between the driver's portion of the vehicle to the back and vice versa without leaving the interior space. The modular compartment 36 should be configured to conform to any applicable regulations.

Systems of modular compartment 36 may be integrated with that of truck 10. As an example, any turn signal/brake lights 52 must be integrated into the vehicle's electrical system. Depending on the equipment installed in vehicle 10 as it left the factory, the original stock wiring harness may be utilized. Other systems that may need to be integrated are rear window defroster and/or wiper, speakers for the vehicle's sound system, HVAC ductwork and registers, running lights, fuel filler pipe/fuel tank etc.

As noted, the addition of modular compartment 36 onto chassis 16 provides a single "passenger continuous" interior compartment for the vehicle. This compartment is accessible through doors 54 of cab 14. Ingress and egress to the rear portion of the compartment can be facilitated by having a clear path from cab doors 54 to the rear portion of the compartment, such as by having cab seats 56 capable of being folded out of the way for passenger convenience. Alternately, the seats can be capable of being flipped up and out of the way of the passenger path or mounted on sliding tracks and slided clear of the expected passenger path. If cab portion 14 is equipped with separate or individual seats, one or all of the seats can be equipped with the features to aid in passenger ingress and egress.

An alternate embodiment of modular compartment 36 is illustrated in FIG. 4 which is designated hereinafter by reference numeral 36'. While still having a single "passenger continuous" internal compartment, additional access routes are provided beyond those available through cab doors 54. More particularly, modular compartment "rear" door 58 can be provided to facilitate passenger ingress and egress. Compartment door 58 can be located on either or both sides of modular compartment 36'. In addition, a tail door 60 can be provided to facilitate additional egress by being hinged in a variety of locations. For instance, access can be provided by having the tail door 60 hinged at the top to swing up, on the side to swing out, etc. It is to be understood that modular compartments 36 and 36' are merely exemplary of the numerous different versions which can be designed and fabricated for retro-fit installation onto chassis 16.

Depending on the intended use of the modified vehicle, certain changes in drivetrain 18 and/or suspension 20 may be desired. If modular compartment 36 is to be used for passenger transportation, modification of suspension 20 may be desired to improve the rider's comfort. For example, a rear anti-sway bar may be added. In addition, sun roofs or just about any other feature found on a factory-built vehicle may be installed.

FIG. 5 is a cross-sectional detail of a preferred sealing arrangement between cab 14 and modular compartment 36. Stiffener 28 is shown having been secured to rear wall 22 of cab 14. As seen, sealing member 34 is disposed between first and second surfaces 30 and 32, respectively, of stiffener 28 and an exterior surface 62 of the modular compartment 36' located adjacent its forward open end. More particularly, exterior surface 62 of modular compartment 36 includes an inwardly extending portion 64 which is generally parallel to stiffener first surface 30 for covering rear wall 22. The exterior surface 62 also includes a forwardly extending portion 66 which is generally parallel to stiffener second surface 32 and which defines the open-ended aperture of modular compartment 36. A second reinforcement member 68 is secured within modular compartment 36 for providing additional structural rigidity to its open-ended aperture. In addition, a decorative exterior facia trim strip 70 can be secured to at least one of rear wall 22 and modular compartment 36 to provide a smooth exterior transition surface between cab 14 and modular compartment 36 for cosmetic purposes. Access holes 72 may be provided through second reinforcement member 68 for permitting installation or removal of facia strip 70. Facia trim strip 70 can be color coordinated with the vehicle. Similarly, a removable interior trim piece 74 can be utilized to enclose the exposed edges of wall portion 66 and sealing member 34 to provide a continuous and cosmetically pleasing interior transition surface within the passenger carrying compartment.

While the above detailed description describes various preferred embodiments of the present invention, it will be understood that the various novel features of the present invention are susceptible to modification, variation and alteration without deviating from the scope and fair meaning of the subjoined claims.

What is claimed is:

1. A modular assembly in combination with a pick-up truck comprising:
 a pick-up truck chassis having a cab assembly which is modified to define a cab aperture having a peripheral flange;
 a structurally self-supported compartment for receiving passengers or cargo, said compartment enclosing an interior space defined by a roof, floor, side and rear walls and defining a compartment aperture at a front wall with a peripheral flange;
 said compartment flange being alignably connected with said cab flange and allowing movement of said passengers or cargo between said compartment and said cab assembly; and
 seal means disposed between said compartment aperture and said cab aperture peripherally about said cab flange for sealingly connecting said compartment and said cab assembly, said means including a stiffening member peripherally positioned about said cab flange, a U-shaped seal member surrounding said cab flange for providing a seal, and a cover concealing said stiffening member and seal member from view.

2. The modular assembly of claim 1 further comprising trim means disposed between said compartment and said cab assembly for providing a continuous and decorative transition surface therebetween.

3. The modular assembly of claim 1 further comprising door means for providing access to said interior space.

* * * * *